United States Patent [19]

Albizzati et al.

[11] Patent Number: 5,068,213

[45] Date of Patent: Nov. 26, 1991

[54] COMPONENTS AND CATALYSTS FOR THE POLYMERIZATION OF OLEFINS

[75] Inventors: Enrico Albizzati, Novara; Giampiero Morini, Pavia; Umberto Giannini, Milan; Luisa Barino, Novara; Raimondo Scordamaglia, Milan; Barbé Pier C.; Luciano Noristi, both of Ferrara, all of Italy

[73] Assignee: Himont Incorporated, Wilmington, Del.

[21] Appl. No.: 675,234

[22] Filed: Mar. 26, 1991

[30] Foreign Application Priority Data

Mar. 30, 1990 [IT] Italy ............................... 19891 A/90

[51] Int. Cl.$^5$ .............................................. C08F 4/646
[52] U.S. Cl. .............................. 502/126; 502/121:122; 502/124; 502/127; 502/134
[58] Field of Search ............... 502/121, 122, 124, 126, 502/134, 127

[56] References Cited

U.S. PATENT DOCUMENTS 4,971,937 11/1990 Albizzati et al. ..................... 502/123
4,978,648 12/1990 Barbé et al. .......................... 502/126

Primary Examiner—Patrick P. Garvin
Assistant Examiner—Brent M. Peebles

[57] ABSTRACT

Catalyst components for the polymerization of olefins comprising a titanium halide or alkoxyhalide and an electron-donor compound selected from ethers having two or more ether groups and containing at least one heteroatom selected from the group consisting of N, S, P, Si, non-ether O and halogen atoms or at least one double bond, or both at least one heteroatom and at least one double bond, supported on a magnesium halide in active form.

Catalysts obtained from said catalyst components and an Al-alkyl compound, as well as catalysts obtained by the reaction of an Al-alkyl compound and an ether having the above defined characteristics with a solid catalyst component comprising a titanium halide or alkoxyhalide and an electron-donor compound having particular characteristics of extractability with Al-triethyl, supported on activated magnesium halide.

6 Claims, No Drawings

COMPONENTS AND CATALYSTS FOR THE POLYMERIZATION OF OLEFINS

The present invention concerns components and catalysts for the polymerization of olefins and their use, particularly in the polymerization of $CH_2=CHR$ olefins, where R is a $C_1$-$C_6$ alkyl radical, an aryl radical, preferably phenyl, or a hydrogen atom.

Catalysts comprising titanium compounds supported on magnesium halides in active form are well known in the art. Catalysts of this type are described, for example, in U.S. Pat. No. 4,278,718.

Said catalysts, although possessing high activity both in the polymerization of ethylene and alpha-olefins such as propylene, do not have adequate stereospecificity.

Said stereospecificity is improved by adding an electron-donor compound to the solid component comprising the titanium compound (U.S. Pat. No. 4,544,713).

Further improvements have been obtained using both an electron-donor compound added to the solid component (internal donor) and one added to the Al-alkyl compound (external donor; U.S. Pat. No. 4,107,414).

High performance, both in terms of activity and stereospecificity, is given by the catalysts described in European patent N. 0045977. The solid component of said catalysts comprises a magnesium halide in active form on which is supported a titanium halide ($TiCl_4$) and an electron-donor compound selected from specific classes of carboxylic acid esters, representative examples of which are the phthalates. The cocatalyst used is an Al-alkyl compound to which is added a silicon compound containing at least one Si-OR bond (R=hydrocarbyl radical).

U.S. Pat. No. 4,522,930 describes catalysts where the solid catalyst component is characterized in that it contains an electron-donor compound, at least 70% in moles of which can be extracted with Al-triethyl under standard extraction conditions, and it has, after extraction, a surface area of at least 20 $m^2/g$.

Said catalysts comprise, as cocatalyst, an Al-trialkyl compound to which is added an electron-donor compound which does not undergo complexing reactions with Al-triethyl detectable by means of potentiometric titration under specified reaction conditions. Examples of the above mentioned electron-donor compounds are silicon compounds having Si-OR bonds where R is a hydrocarbyl radical; 2,2,6,6-tetramethylpiperidine, 2,2,5,5-tetramethylpyrrolidine, Al-diethyl-2,2,6,6-tetramethylpiperidine and Al-dichloromonophenoxy. U.S. Ser. Nos. 07/413410 and 07/413430 describe ethers having particular reaction and structural characteristics which are suited for the preparation of catalysts and catalyst components for the polymerization of the above mentioned olefins.

Now unexpectedly a new class of ethers has been found which is suited for the preparation of highly active and stereospecific catalysts and catalyst components for the polymerization of these olefins.

In fact, the ethers of the invention, together with Al-alkyl compounds and in combination with solid catalyst components having the characteristics described in U.S. Pat. No. 4,522,930, form highly active and stereospecific catalysts. Ethers of the invention having a particular structure, moreover, when present in solid catalyst components comprising a titanium halide or alkoxyhalide supported on a magnesium halide in active form, can provide highly active and stereospecific catalysts even without the use of electron-donor compounds added to the Al-alkyl compound.

The ethers of the invention contain at least two or more ether groups, and at least one heteroatom selected from the group consisting of N, S, P, Si, non-ether O and halogen atoms, or at least one double bond, or contain both at least one heteroatom as defined above and at least a double bond.

Representative ethers which are particularly useful, when present in the solid catalyst component, to form highly active and stereospecific catalysts, even without the use of additional electron-donor compounds added to the Al-alkyl compound, are 1,3-diethers of the formula

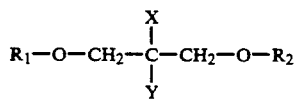

where $R_1$ and $R_2$ are the same or different and are hydrocarbon radicals with 1-6 carbon atoms, optionally unsaturated and/or containing halogen atoms;

X is a hydrocarbon radical having 1-18 carbon atoms, containing at least one heteroatom which is not directly bonded to the central carbon atom (in the 2 position) of the 1,3-diether molecules, wherein the heteroatom is selected from the group consisting of N, S, P, Si, non-ether O and halogen atoms, or X is a halogen atom or a heteroatom-containing group wherein one heteroatom is bonded directly to the central carbon atom of the 1,3-diether of the above formula and which is selected from the group consisting of $-NR'R''$, $-SO_2R'$, $-SOR'$, $-OP(OR')(OR'')$, $-OP(O)(OR')(OR'')$, $-Si(R'R'')_m(OR''')_n$ and $-OSi(R'R'')_m(OR''')_n$ where R', R'', R''' are hydrocarbon radicals optionally unsaturated, having 1-18 carbon atoms, and R' and R'' together, in the case of NR'R'', can also form a cyclic structure, and R' or R'' or both, in the case of $-Si(R'R'')_m(OR''')_n$ and $-OSi(R'R'')_m(OR''')_n$, can also be hydrogen or halogen, m and n are numbers from 0 to 3, and m+n=3; or X is a $R^{IV}$ hydrocarbyl group having 1-18 carbon atoms containing at least one double bond, and optionally containing one or more heteroatoms selected from the group consisting of halogen, non-ether O and N, S, P, and Si;

Y is equal to X when X is halogen, $-Si(R'R'')_m(OR''')_n$, or $R^{IV}$ radical, or Y is a hydrogen or an $R^V$ hydrocarbon radical containing 1-18 carbon atoms;

X and Y moreover can be bonded together to form an $R^{VI}$ hydrocarbon radical having 1-18 carbon atoms and optionally containing heteroatoms selected from the group consisting of N, S, P, Si, non-ether O and halogen atoms said $R^{VI}$ being also optionally bonded to the central carbon atom through a double bond.

Representative example of 1,3-diether containing halogen atoms are:

2-isopropyl-2-trifluoromethyl-1,3-dimethoxypropane;
2-isopropyl-2-trifluoromethyl-1,3-dibutoxypropane;
2-isopropyl-2-trifluoromethyl-1,3-dibuthoxypropane;
2-isobutyl-2-trifluoromethyl-1,3-dimethoxypropane;
2-(2-chloro-n-propyl)-2-n-propyl-1,3-dimethoxypropane;

2-(chloroneopentyl)-2-methyl-1,3-dimethoxypropane;
2-(4-chloro-3,3-dimethylbutyl)-2-ethyl-1,3-dimethoxypropane;
2-(p-chloromethylphenyl)-2-isobutyl-1,3-dimethoxypropane;
2-(p-chloromethylphenyl)-2-isobutyl-1,3-diethoxypropane;
2-(4-chlorocyclohexyl)-2-isobutyl-1,3-dimethoxypropane;
2-(4-chlorocyclohexyl)-2-isobutyl-1,3-diethoxypropane;
2-(4-chlorocyclohexyl)-2-isobutyl-1,3-dibutoxypropane;
2,2-bis(4-chlorocyclohexyl)-1,3-dimethoxypropane;
2-(2-chloromethyl-2-propenyl)-2-isobutyl-1,3-dimethoxypropane;
2-(bromoneopentyl)-2-methyl-1,3-dimethoxypropane;
2-(bromoneopentyl)-2-ethyl-1,3-dimethoxypropane;
2-(iodoneopentyl)-2-ethyl-1,3-dimethoxypropane;
2-(chloromethyl)-2-isobutyl-1,3-dimethoxypropane;
2-(chloromethyl)-2-isobutyl-1,3-diethoxypropane;
2-(3-chloro-2-methyl-2-propenyl)-2-propyl-1,3-dimethoxypropane;
2,2-bis(4-chlorocyclohexylmethyl)-1,3-dimethoxypropane;
1,1-bis(methoxymethyl)-4-chloro-decahydronaphthalene;
1,1-bis(methoxymethyl)-6-chloro-tetrahydronaphthalene;
1,1-bis(methoxymethyl)-2-isopropyl-5-chlorocyclohexane;
2,2-bis(methoxymethyl)-5-chloro-bicyclo[2.2.1]heptane;
2-chloro-2-ethyl-1,3-dimethoxypropane;
2-chloro-2-ethyl-1,3-diethoxypropane;
2-bromo-2-ethyl-1,3-dimethoxypropane;
2-chloro-2-n-propyl-1,3-dimethoxypropane;
2-chloro-2-n-propyl-1,3-diethoxypropane;
2-chloro-2-n-propyl-1,3-dibutoxypropane;
2-bromo-2-n-propyl-1,3-dimethoxypropane;
2-bromo-2-n-propyl-1,3-diethoxypropane;
2-chloro-2-n-butyl-1,3-dimethoxypropane;
2-chloro-2-isobutyl-1,3-dimethoxypropane;
2-chloro-2-isobutyl-1,3-diethoxypropane;
2-chloro-2-isoamyl-1,3-dimethoxypropane;
2-chloro-2-isoamyl-1,3-diethoxypropane;
2-chloro-2-neopentyl-1,3-dimethoxypropane;
2-chloro-2-cyclohexyl-1,3-dimethoxypropane;
2-chloro-2-phenyl-1,3-dimethoxypropane;
2,2-dichloro-1,3-dimethoxypropane;
2-chloro-2-phenyl-1,3-diethoxypropane;
2-bromo-2-phenyl-1,3-dimethoxypropane;
2-chloro-2-trifluoromethyl-1,3-dimethoxypropane;
2-chloro-2-(chloroneopentyl)-1,3-dimethoxypropane;
2-chloro-2-(4-chlorocyclohexyl)-1,3-dimethoxypropane;
2-chloro-2-chloromethyl-1,3-dimethoxypropane;
2-chloro-2-(p-chlorophenyl)-1,3-dimethoxypropane;

Examples representative of 1,3-diethers containing heteroatoms different from halogens are:
2-trimethylsilyl-1,3-dimethoxypropane;
2-(2-trimethylsilylethyl)-1,3-dimethoxypropane;
2-trimethylsilyl-2-ethyl-1,3-dimethoxypropane;
1-methyl-2-trimethylsilyl-2-ethyl-1,3-dimethoxypropane;
2-triphenylsilyl-1,3-dimethoxypropane;
2,2-bis(p-trimethylsilyl-phenyl)-1,3-dimethoxypropane;
2-(4-[1-silolanyl]-butyl)-2-ethyl-1,3-dimethoxypropane;
2,2-bis(trimethylsilylmethyl)-1,3-dimethoxypropane;
2-(4-N,N-diisobutylaminobutyl)-2-ethyl-1,3-dimethoxypropane;
2-(1-piperidyl)-2-propyl-1,3-dimethoxypropane;
2-(1-piperidyl)-2-isopropyl-1,3-dimethoxypropane;
2-(1-piperidyl)-2-n-isobutyl-1,3-dimethoxypropane;
2-(1-piperidyl)-2-n-propyl-1,3-diethoxypropane;
2-(1-piperidyl)-2-n-propyl-1,3-dibutoxypropane;
2-(2,6-dimethyl-1-piperidyl)-2-n-propyl-1,3-dimethoxypropane;
2-(4-N,N-bis[trimethylsylyl]-amminobutyl)-2-propyl-1,3-dimethoxypropane;
2-trimethylsilyloxy-2-n-propyl-1,3-dimethoxypropane;
2-trimethylsilyloxy-2-n-propyl-1,3-diethoxypropane;
2-trimethylsilyloxy-2-n-propyl-1,3-dibutoxypropane;
2-trimethylsilyloxy-2-isopropyl-1,3-dimethoxypropane;
2-trimethylsilyloxy-2-isopropyl-1,3-diethoxypropane;
2-trimethylsilyloxy-2-isobutyl-1,3-dimethoxypropane;
2-trimethylsilyloxy-2-isobutyl-1,3-diethoxypropane;
2-trimethylsilyloxy-2-isoamyl-1,3-dimethoxypropane;
2-trimethylsilyloxy-2-isoamyl-1,3-diethoxypropane;
2-benzoyloxy-2-n-propyl-1,3-dimethoxypropane;
2-benzoyloxy-2-isobutyl-1,3-dimethoxypropane;
2-trimethylsilyl-2-n-propyl-1,3-dimethoxypropane;
2-pivaloxy-2-n-propyl-1,3-dimethoxypropane;
2-t-butylmercapto-2-ethyl-1,3-dimethoxypropane;
2,2-bis(p-diphenylphosphinophenyl)-1,3-dimethoxypropane;
2,2-bis(p-pivaloxyphenyl)-1,3-dimethoxypropane;
2-(3-N,N-diphenylaminopropyl)-2-n-propyl-1,3-dimethoxypropane;
2-ethyl-2-methoxysulfonyl-1,3-dimethoxypropane;
2-isopropyl-2-ethylsulfonyl-1,3-dimethoxypropane;
1,1-bis(methoxymetyl)-1-ethyl-diphenylphosphite;
1,1-bis(methoxymetyl)-1-ethyl-diphenylphosphate;

Examples representative of 1-3 ethers containing unsaturations are:
2-(1-ethyl-propylidenyl)-1,3-dimethoxypropane;
2-(1-ethyl-isobutylidenyl)-1,3-dimethoxypropane;
2-(1-phenyl-isobutylidenyl)-1,3-dimethoxypropane;
2-(1-propyl-isoamylidenyl)-1,3-dimethoxypropane;
2-(1-propyl-butylidenyl)-1,3-dimethoxypropane;
2-(α-phenyl-benzylidenyl)-1,3-dimethoxypropane;
2-isoamylidenyl-1,3-dimethoxypropane;
2-(2-norbornylidenyl)-1,3-dimethoxypropane;
2-(1-isoamyl-isoamylidenyl)-1,3-dimethoxypropane;
2-isobutyl-2-(3,3-dimethylallyl)-1,3-dimethoxypropane;
2-2-bis(3,3-dimethylallyl)-1,3-dimethoxypropane;
2-isobutyl-2(2-methyl-2-butenyl)-1,3-dimethoxypropane;
2-isopropyl-2(5-norbornene-2-yl)-1,3-dimethoxypropane;
2-isoamyl-2-crotyl-1,3-dimethoxypropane;
2-cyclopentylidenyl-1,3-dimethoxypropane;
2-isopropyl-2-cinnamyl-1,3-dimethoxypropane;
2-isobutyl-2-(3-methyl-2-pentenyl)-1,3-dimethoxypropane;
2,2-bis(3-cyclohexenylmethyl)-1,3-dimethoxypropane;
2,2-bis(methoxymethyl)-5-norbornene;
2,3-bis(methoxymethyl)-5-norbornene;
2-isobutyl-2-(1-methylpropenyl)-1,3-dimethoxypropane;
1-allyl-2,2-dimethyl-1,3-dimethoxypropane;
2,2-diisobutyl-1-methoxy-3-allyloxypropane;
2-(1-propyl-isoamylidenyl)-1-methoxy-3-allyloxypropane;
1-(1-methylpropenyl)-2,2-dimethyl-1,3-dimethoxypropane;

2-(1-methyl-ethylidenyl)-1,3-dimethoxypropane;
2-(1-isopropyl-isobutylidenyl)-1,3-dimethoxypropane;
2-(1-t-butyl-isobutylidenyl)-1,3-dimethoxypropane;
2-(dicyclohexyl-methylidenyl)-1,3-dimethoxypropane;
2-(1-isopropyl-isohexylidenyl)-1,3-dimethoxypropane;
2-(1-cyclohexyl-isobutylidenyl)-1,3-dimethoxypropane;
2-(1-ethyl-neopentylidenyl)-1,3-dimethoxypropane;
2-(1-cyclohexyl-n-propylidenyl)-1,3-dimethoxypropane;
2-(α-cyclohexyl-benzylidenyl)-1,3-dimethoxypropane;
2-(1-methyl-neopentylidenyl)-1,3-dimethoxypropane;

Examples representative of 1,3-diethers containing heteroatoms and unsaturations are:

2-isopropyl-2-(6-chloro-5,5-dimethyl-2-hexenyl)-1,3-dimethoxypropane;
2-isopropyl-2-(3-chloroallyl)-1,3-dimethoxypropane;
2-isobutyl-2-(5-p-trifluoromethylphenyl)-2-pentenyl-1,3-dimethoxypropane;
2-methyl-2-(3-chloro-2,2-dimethylpropylidenyl)-1,3-dimethoxypropane;
2-isopropyl-2-(4-diisobutylamino-2-butenyl)-1,3-dimethoxypropane;
2-allyl-2-pyridyl-1,3-dimethoxypropane;
2-isopropyl-2-(4-trimethylsylyl-2-butenyl)-1,3-dimethoxypropane;

Other examples of usable ethers are:

2-chloromethyl-1,2,2-trimethyl-1,2-dimethoxyethane;
2,2-diisobutyl-1-methoxy-3-(2-chloroethoxy)propane;
1-(3-chloro-2-methyl-2-propenyl)-2,2-diisobutyl-1,3-dimethoxypropane;
1-(3-chloropropyl)-2,2-diisobutyl-1,3-dimethoxypropane;
1-chloro-2,2-diisopropyl-1,3-dimethoxypropane;
1,3-dichloro-2-isobutyl-1,3-dimethoxypropane;
1-methyl-2-chloro-2-isopropyl-1,3-dimethoxypropane;
1-chloro-2-isopropyl-2-isobutyl-1,3-dimethoxypropane;
1-chloro-2,2-diisopropyl-1,3-diethoxypropane;
2-chloro-2-ethyl-1-methoxy-3-(2-chloroethoxy)propane;
2-chloro-2-n-propyl-1-methoxy-3-(2-chloroethoxy)propane;
2-chloro-2-phenyl-1-methoxy-3-(2-chloroethoxy)propane;
2-chloro-2-ethyl-1,3-bis(2-chloroethoxy)propane;
2-chloro-2-n-propyl-1,3-bis(2-chloroethoxy)propane;
2-chloro-2-phenyl-1,3-bis(2-chloroethoxy)propane;
1,3-dichloro-2-isobutyl-1,3-diethoxypropane;
1,3-dichloro-2-isobutyl-1,3-dibutoxypropane;
1,4-dimethoxy-bis-2-butene;
1-allyl-1,2,2-trimethyl-1,2-dimethoxyethane;
2,3-bis(3-cyclohexenyl)1,4-dimethoxybutane;
2,3-bis(3-cyclohexenyl)-1,4-diethoxybutane;

The compounds of the invention are prepared according to methods known in the literature. For example, 2-chloro-2-alkyl-1,3-dialkoxypropanes can be synthesized according to the method described in Vol 65, 3727c of the Chemical Abstracts (1966).

Ethers containing unsaturations can be synthesized by Witting reaction starting from the dialkoxyketones and corresponding phosphorus ylids (obtained by the reaction of triphenylphosphine and alkyl halides).

1,3-diethers containing halogens on the hydrocarbon substituents in the 2 position can be synthesized by the reaction of 1,3-diethers, containing unsaturations in the hydrocarbon substituents in the 2 position, and the corresponding hydrogen halides.

Ethers containing heteroatoms other than halogen can also be prepared according to known methods described in the literature; for example, the 2-alkyl-2-(trialkylsylyloxy)-1,3-dialkoxypropanes can be synthesized by reaction between the 2-hydroxy-2-alkyl-1,3-dialkoxypropanes (obtained by the reaction of a dialkoxyacetone and a Grignard) and the corresponding chlorotrialkylsilanes.

As already indicated the electron-donor compounds of the invention can be used together with Al-alkyl compounds to form, in combination with the catalyst components described in U.S. Pat. No. 4,522,930, highly active and stereospecific catalysts. When the 1,3-diethers included in the formula described above are present in the solid catalyst component comprising a titanium halide or alkoxyhalide supported on magnesium halide in active form, they form, together with Al-alkyl compounds, highly active and stereospecific catalysts even without the addition of electron-donor compounds to the Al-alkyl compound.

The catalyst components described in U.S. Pat. No. 4,522,930 comprise a titanium compound containing at least one Ti-halogen bond and an electron-donor compound, at least 70 mole % of which is extractable with Al-triethyl under standard extraction conditions. After extraction, the solid has a surface area (B.E.T.) of at least 20 m$^2$/g and generally between 100 and 300 m$^2$/g.

Electron-donor compounds which can be used in preparing the catalyst components described in U.S. Pat. No. 4,522,930 comprise ethers, ketones, lactones, compounds containing N, P, and/or S atoms, and particular types of esters. Besides the esters of U.S. Pat. No. 4,522,930, the class of esters described in European patent No. 0045977 can also be used.

Particularly suited are phthalic acid esters, such as diisobutyl, dioctyl and diphenylphthalate, benzylbutylphthalate; malonic acid esters, such as diisobutyl and diethylmalonate; alkyl and aryl pivalates, alkyl, cycloalkyl and aryl maleates, alkyl and aryl carbonates, such as diisobutyl carbonate, ethyl phenyl carbonate, and diphenyl carbonate; and succinic acid esters, such as mono and diethyl succinate. Phthalic acid esters are preferred.

The preparation of catalyst components containing the ethers of the invention is done according to various methods.

For example, the magnesium halide (used in the anhydrous state containing less than 1% water), the titanium compound, and the ether compound are ground together under conditions where the magnesium halide is activated. The ground product is then treated one or more times with excess TiCl$_4$ at temperatures from 80° to 135° C., and subsequently washed repeatedly with a hydrocarbon (hexane) until no chloride ions are in the wash.

According to another method, the anhydrous magnesium halide is preactivated according to known methods, and then reacted with excess TiCl$_4$ containing the ether compound in solution. In this case the operation also takes place at a temperature from 80° to 135° C. Optionally the TiCl$_4$ treatment is repeated and the solid washed with hexane or heptane to eliminate the traces of nonreacted TiCl$_4$.

According to another method, a MgCl$_2$.nROH adduct (particularly in the form of spheroidal particles) where n is generally from 1 to 3 and ROH is ethanol, butanol, isobutanol, is reacted with excess TiCl$_4$ containing the ether compound in solution. The temperature is generally from 80° to 120° C. After reaction the solid is reacted once more with TiCl$_4$, and then separated and washed with a hydrocarbon until no chloride ions appear in the wash.

According to yet another method, magnesium alkoxides and alkoxyhalides (the alkoxyhalides can be prepared particularly according to U.S. Pat. No. 4,220,554) are reacted with excess TiCl$_4$ containing the electron-donor compound of the invention in solution, operating under the same conditions already described.

According to another method, magnesium halide complexes with titanium alkoxides (the MgCl$_2$.2Ti(OC$_4$H$_9$)$_4$ complex is a typical example) are reacted, in hydrocarbon solution, with excess TiCl$_4$ containing the ether compound in solution; the solid product which is separated is reacted again with excess TiCl$_4$, and then separated and washed with hexane. The reaction with TiCl$_4$ is done at a temperature from 80° to 120° C.

According to an alternative embodiment, the MgCl$_2$ complex with the titanium alkoxide is reacted in hydrocarbon solution with methyl-hydropolysiloxane. The solid product is separated and is reacted at 50° C. with silicon tetrachloride containing the ether compound in solution. The resulting solid is then reacted with excess TiCl$_4$ at 80°-120° C.

Finally, it is possible to react with the excess TiCl$_4$ containing the ether compound in solution, porous resins, such as partially crosslinked styrene-divinylbenzene resins in the form of spherical particles, or inorganic porous oxides, such as silica and alumina, impregnated with solutions of Mg compounds or complexes soluble in organic solvents.

Porous resins which can be used are described in U.S. application Ser. No. 359234. The reaction with TiCl$_4$ is done at 0°-120° C. After separating the excess TiCl$_4$, the reaction is repeated and the solid is then washed with a hydrocarbon solvent.

The molar ratio between MgCl$_2$ and the electron-donor compound used in the above reactions is generally from 2:1 to 12:1.

The electron-donor compound is generally fixed on the magnesium halide in quantities from 5 to 20 mole %.

However, in the case of components supported on porous resins and inorganic oxides, the molar ratio between ether and magnesium is different, i.e., generally from 0.1 to 1.

The Mg/Ti ratio in the catalyst components is generally from 30:1 and 4:1. The ratio is different in components supported on porous resins or inorganic oxides, and is generally from 10:1 to 2:1.

Titanium compounds which can be used for the preparation of catalyst components are halides and alkoxyhalides. Titanium tetrachloride is the preferred compound. Satisfactory results are obtained also with titanium trihalides, particularly TiCl$_3$HR, TiCl$_3$ARA, and with alkoxy halides such as TiCl$_3$OR where R is a phenyl radical. The preparation methods indicated above can be used also for preparing catalyst components containing electron-donor compounds which are different from the ethers of the invention, such as the ones described in U.S. Pat. No. 4,522,930, for example.

The preparations indicated above lead to the formation of magnesium halide in active form. Preparations which lead to the formation of magnesium halide in active form starting from magnesium compounds other than magnesium halides are well known in the literature Examples of the preparation of catalyst components which lead to the formation of magnesium halides in active form and can be used for the preparation of catalyst components according to the invention, or which can be used for the preparation of catalysts according to the invention, are described in the following U.S. patents: U.S. Pat. Nos. 4,335,015, 4,547,476, 4,647,550, 4,393,182, 4,780,443, 4,771,024.

The active form of magnesium halides in the catalyst components is evidenced by the fact that the X-ray diffraction spectrum of the catalyst component no longer shows the major intensity reflection which appears in the spectrum of nonactivated magnesium halides (having a surface area smaller than 3 m$^2$/g), and in its place a halo appears with the maximum intensity shifted with respect to the position of the maximum intensity reflection, or the maximum intensity reflection is less intense and presents a half-peak breadth at least 30% greater than that of the major intensity reflection which appears in the spectrum of the nonactivated Mg halide.

The most active forms of magnesium halide are those where the X-ray spectrum of the solid catalyst component shows a halo.

Among the magnesium halides, the magnesium chloride is the preferred compound. In the case of the most active forms of magnesium chloride, the X-ray spectrum of the catalyst component shows a halo instead of the reflection, which in the spectrum of the chloride is situated at the interplanary distance of 2.56 Å.

Solid catalyst components containing the ether compound of the invention form, by reaction with Al-alkyl compounds, catalysts which can be used in the polymerization of CH$_2$=CHR olefins, where R is hydrogen, or an alkyl radical with 1-6 carbon atoms, or an aryl preferably a phenyl, or mixtures of said olefins and/or mixtures thereof with diolefins having at least one olefinic unsaturation in the alpha position.

In the case of polymerization of CH$_2$=CHR olefins, where R is hydrogen, or an alkyl radical with 1-8 carbon atoms, or aryl, and particularly when the olefin is propylene, the Al-alkyl compounds which can be used are selected from Al-trialkyls such as Al-trimetyl, Al-trietyl, Al-triisobutyl, Al-tri-n-butyl, and linear or cyclic Al-alkyl compounds containing two or more Al atoms linked to each other through O or N atoms, or SO$_4$ and SO$_3$ groups.

Examples of these compounds are:

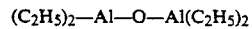

(C$_2$H$_5$)$_2$—Al—O—Al(C$_2$H$_5$)$_2$

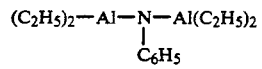

(C$_2$H$_5$)$_2$—Al—N—Al(C$_2$H$_5$)$_2$
　　　　　　　|
　　　　　　C$_6$H$_5$

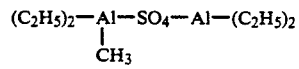

(C$_2$H$_5$)$_2$—Al—SO$_4$—Al—(C$_2$H$_5$)$_2$
　　　　　　　　　　|
　　　　　　　　　CH$_3$

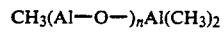

CH$_3$(Al—O—)$_n$Al(CH$_3$)$_2$

CH$_3$
|
(Al—O—)$_n$ where n is a number from 1 to 20.

One can also use AlR$_2$OR' compounds where R' is a C$_6$-C$_{12}$ aryl radical substituted in the 2 and/or 6 position with a C$_1$-C$_6$ alkyl radical linear or branched, and R is an alkyl radical with 1-8 carbon atoms, as well as Al—R$_2$H compounds where R has the above mentioned meaning.

The Al-alkyl compound is used in such amounts that the Al/Ti ratio is generally from 1 to 1000.

In the case of polymerization of propylene and similar alpha-olefins, the trialkyl compounds can be used in mixture with Al-alkyl halides, such as $AlEt_2Cl$ and $Al_2Et_3Cl_3$.

The above mentioned Al-alkyl compounds can also be used when the ether compound is used as an external donor, that is to say that it is added to the Al-alkyl compound. In this case, as already indicated, the solid component contains an electron-donor compound having the characteristics indicated in U.S. Pat. No. 4,522,930 and EP 0045977.

Polymerization of olefins is carried out according to known methods operating in liquid phase comprising the monomer or monomers, or a solution of same, in an aliphatic or aromatic hydrocarbon solvent, or in gas phase, or even combining polymerization stages in liquid and gas phase.

(Co)polymerization temperature is generally from 0° C. to 150° C.; particularly from 60° to 100° C. The operation takes place under atmospheric pressure or higher. The catalysts can be precontacted with small quantities of olefins (prepolymerization). Prepolymerization improves both the catalyst performance and the morphology of the polymers. The prepolymerization is carried out maintaining the catalyst in suspension in a hydrocarbon solvent (hexane, heptane etc.) and it is polymerized at a temperature between room temperature and 60° C., producing quantities of polymer generally from 0.5 and 3 times the weight of the catalyst. It can also be done in liquid propylene, under the temperature conditions indicated above, thus producing quantities of polymer which can reach 100 g per g of catalyst component.

In the case of stereoregular polymerization of olefins, if an electron-donor compound is added to the Al-alkyl, the ratio between Al-alkyl and electron-donor compound is generally from 5:1 to 100:1.

The following examples are given in order to illustrate, but not limit the invention.

EXAMPLE 1

1000 ml n-heptane, 5 mmoles $Al(C_2H_5)_3$, 30 mg catalyst component, and 1 mmole 2-(2-chloro-n-propyl)-2-n-propyl-1,3-dimethoxypropane are introduced in a stainless steel 2000 ml autoclave equipped with anchor stirrer under propylene current at 25° C.

The autoclave is closed, and after the pressure is brought to 1 atm, a hydrogen overpressure equal to 0.2 atm is introduced. The content is then heated to 70° C. and the total pressure is brought to 7 atm with propylene.

Polymerization is carried out for 2 hours while the monomer is fed continuously. The polymer thus obtained is separated by filtration. The polymer which remained in the filtrate is precipitated with methanol, dried in vacuum and considered in the determination of the total n-heptane extraction residue. A polymer yield equal to 8000 g of PP/g of catalyst component and having a 92 isotactic index are obtained.

The catalyst component which was used was prepared with the following methods.

225 ml of $TiCl_4$ are introduced at 0° C. in a 500 ml reactor equipped with filtering septum. Over 15 minutes are added, under agitation, 10.1 g (54 mmoles) of microspheroidal adduct $MgCl_2.2.1C_2H_5OH$ obtained with the method described in example 1 of U.S. Pat. No. 4,469,648.

Once the addition is completed, the temperature is brought to 40° C., and 9 mmoles of diisobutylphthalate are introduced. The temperature is then brought to 100° C. in 1 hour. The reaction is allowed to proceed for 2 hours, after which the $TiCl_4$ is removed by filtration. An additional 200 ml of $TiCl_4$ are introduced, and the contents are allowed to react at 120° C. for 1 hour, and then filtered and washed at 60° C. with n-heptane until no chloride ions appear in the filtrate.

EXAMPLE 2

Operating under the conditions of example 1, but using 1 mmole of 2-(1-methyl-neopentylidene)-1,3-dimethoxypropane instead of 2-(2-chloro-n-propyl)-2-n-propyl-1,3-dimethoxypropane a polymer having an isotactic index of 95 with a yield equal to 10,000 g PP/g catalyst component is obtained.

EXAMPLE 3

Operating under the conditions of example 1, but using 1 mmole of 2-n-propyl-2-trimethylsilyloxy-1,3-dimethoxypropane instead of 2-(2-chloro-n-propyl)-2-n-propyl-1,3-dimethoxypropane, a polymer having an isotactic index of 93.9 with a yield equal to 4300 g of PP/g of catalyst component is obtained.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

We claim:

1. A catalyst for the polymerization of olefins comprising the reaction product of:
    a) an Al-alkyl compound,
    b) an ether containing two or more ether groups and at least one heteroatom selected from the group consisting of N, P, S, Si, non-ether O and halogen atoms, or at least one double bond, or both at least a heteroatom and at least one double bond, and
    c) a solid catalyst component comprising a magnesium dihalide in active form having supported thereon a titanium halide or alkoxyhalide and an electron-donor compound, at least 70% in moles of which can be extracted from the solid with Al-triethyl, and wherein the solid catalyst component, after extraction, has a surface area greater than 20 $m^2/g$.

2. The catalyst of claim 1 wherein the Al-alkyl compound is an Al-triethyl, and the electron-donor compound present in component c) is a phthalic acid ester.

3. A catalyst component for the polymerization of olefins comprising an activated magnesium halide having supported thereon a titanium halide or alkoxyhalide and an ether compound of the formula

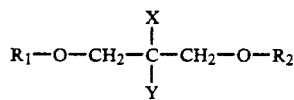

where $R_1$ and $R_2$ are the same or different and are hydrocarbon radicals with 1–6 carbon atoms, optionally unsaturated and/or containing halogen atoms, X is a hydrocarbon radical having 1–18 carbon atoms, containing at least one heteroatom which is not directly bonded to the central carbon atom (in the 2 position) of the 1,3-diether molecules, wherein the heteroatom is selected from the group consisting of N, S, P, Si, non-ether O and halogen atoms, or X is a halogen atom or a heteroatom-containing group wherein one heteroatom is bonded directly to the central carbon atom of the 1,3-diether of the above formula and which is selected from the group consisting of —NR'R", —SO$_2$R', —SOR', —OP(OR')(OR"), —OP(O)(OR')(OR"), —Si(R'R")$_m$(OR''')$_n$ and —OSi(R'R")$_m$(OR''')$_n$ where R', R", R''' are hydrocarbon radicals optionally unsaturated, having 1–18 carbon atoms, and R' and R" together, in the case of NR'R", can also form a cyclic structure, and R' or R" or both, in the case of —Si(R'R")$_m$(OR''')$_n$ and —OSi(R'R")$_m$(OR''')$_n$, can also be hydrogen or halogen, m and n are numbers from 0 to 3, and m+n=3; or X is a R$^{IV}$ hydrocarbyl group having 1–18 carbon atoms containing at least one double bond, and optionally containing one or more heteroatoms selected from the group consisting of N, S, P, Si, non-ether O and halogen atoms;

Y is equal to X when X is halogen, —Si(R'R")$_m$(OR''')$_n$, or R$^{IV}$ radical, or Y is a hydrogen or an R$^V$ hydrocarbon radical containing 1–18 carbon atoms;

X and Y moreover can be bonded together to form an R$^{VI}$ hydrocarbon radical having 1–18 carbon atoms and optionally containing heteroatoms selected from the group consisting of halogen, non-ether O and N, S, P, and Si, said R$^{VI}$ being also optionally bonded to the central carbon atom through a double bond.

4. The catalyst component of claim 3, wherein the ether compound contains a halogen atom not directly bonded to the central carbon atom.

5. The catalyst component of claim 3, wherein the ether compound contains an R$^{VI}$ radical containing a double bond directly bonded to the central carbon atom.

6. The catalyst component of claim 3, wherein X is a heteroatom-containing group of formula —OSi(R'R")$_m$(OR''')$_n$ directly bonded to the central carbon atom.

* * * * *

UNITED STATES PATENT AND TRADEMARK OFFICE
CERTIFICATE OF CORRECTION

PATENT NO. : 5,068,213

DATED : November 26, 1991

INVENTOR(S) : Albizzati et al

It is certified that error appears in the above-identified patent and that said Letters Patent is hereby corrected as shown below:

Title page, under Assignee:, change "Hinmont" to --Himont--.

At col. 2, line 64, change "-dibutoxypropane" to --diethoxypropane--.

At col. 2, line 65, change "-dibuthoxypropane" to --dibutoxypropane--.

Signed and Sealed this

Second Day of November, 1993

Attest:

BRUCE LEHMAN

Attesting Officer

Commissioner of Patents and Trademarks